(12) United States Patent
Franzaroli

(10) Patent No.: US 11,970,298 B2
(45) Date of Patent: *Apr. 30, 2024

(54) PLANT FOR PROCESSING PRODUCTS INCLUDING A UNIT FOR DETECTING DEFECTIVE PRODUCTS

(71) Applicant: PULSAR S.R.L., Castel Maggiore (IT)

(72) Inventor: Massimo Franzaroli, Castel Maggiore (IT)

(73) Assignee: PULSAR S.R.L., Castel Maggiore (IT)

( * ) Notice: Subject to any disclaimer, the term of this patent is extended or adjusted under 35 U.S.C. 154(b) by 58 days.

This patent is subject to a terminal disclaimer.

(21) Appl. No.: 17/146,166

(22) Filed: Jan. 11, 2021

(65) Prior Publication Data

US 2021/0130018 A1    May 6, 2021

Related U.S. Application Data

(62) Division of application No. 15/550,242, filed as application No. PCT/IB2016/051029 on Feb. 25, 2016, now Pat. No. 10,906,676.

(30) Foreign Application Priority Data

Feb. 27, 2015  (IT) .......................... BO2015U000016
May 4, 2015   (IT) .......................... BO2015U000039
Jun. 19, 2015  (IT) ....................... 202015000025907

(51) Int. Cl.
*G06K 9/00*     (2022.01)
*B65B 11/58*    (2006.01)
(Continued)

(52) U.S. Cl.
CPC .......... *B65B 25/146* (2013.01); *B65B 11/585* (2013.01); *B65B 35/10* (2013.01);
(Continued)

(58) Field of Classification Search
CPC ... G06T 7/0002; G06T 7/0004; G06T 7/0006; G06T 7/0008; G06T 7/001;
(Continued)

(56) References Cited

U.S. PATENT DOCUMENTS 3,098,565 A   7/1963  Fouse et al.
4,308,959 A   1/1982  Hoover
(Continued)

FOREIGN PATENT DOCUMENTS

CN    104142349 A    11/2014
EP    0854090 A1     7/1998
(Continued)

OTHER PUBLICATIONS

Franzaroli, Massimo—U.S. Appl. No. 16/870,617, filed May 8, 2020.
(Continued)

*Primary Examiner* — Atiba O Fitzpatrick
(74) *Attorney, Agent, or Firm* — SHUTTLEWORTH & INGERSOLL, PLC; Timothy J. Klima

(57) ABSTRACT

A processing plant, in particular for making respective products, in particular defined by articles or packages of respective articles, the articles being preferably in the form of articles of the tissue industry, the plant including at least one unit for detecting products, in particular defective products, especially defective articles and/or packages, preferably for detecting defective rolls and/or packs.

21 Claims, 8 Drawing Sheets

(51) Int. Cl.
  *B65B 25/14* (2006.01)
  *B65B 35/10* (2006.01)
  *B65B 57/00* (2006.01)
  *B65B 57/02* (2006.01)
  *B65B 57/10* (2006.01)
  *B65B 65/00* (2006.01)
  *G01N 21/90* (2006.01)
  *G01N 21/95* (2006.01)
  *G06T 7/00* (2017.01)
  *B65B 11/00* (2006.01)

(52) U.S. Cl.
  CPC .............. *B65B 57/00* (2013.01); *B65B 57/02* (2013.01); *B65B 57/10* (2013.01); *B65B 65/006* (2013.01); *G01N 21/90* (2013.01); *G01N 21/95* (2013.01); *G06T 7/0002* (2013.01); *G06T 7/0004* (2013.01); *G06T 7/0006* (2013.01); *G06T 7/0008* (2013.01); *G06T 7/001* (2013.01); *B65B 11/00* (2013.01); *B65B 2210/02* (2013.01); *G06T 2207/30108* (2013.01); *G06T 2207/30124* (2013.01)

(58) Field of Classification Search
  CPC ........... G06T 2207/30108; G06T 2207/30124; B26D 5/007; B65B 25/146; B65B 25/148; B65B 25/14; B65B 25/141; B65B 25/143; B65B 25/145
  See application file for complete search history.

(56) References Cited

U.S. PATENT DOCUMENTS

| | | | |
|---|---|---|---|
| 4,593,806 A | 6/1986 | Tappe | |
| 5,255,495 A | 10/1993 | Kovacs | |
| 5,917,034 A | 6/1999 | Brown | |
| 5,917,934 A * | 6/1999 | Chiu | G06T 7/0006 348/125 |
| 6,054,665 A | 4/2000 | Focke et al. | |
| 6,373,519 B1 | 4/2002 | Sybert | |
| 6,994,206 B2 | 2/2006 | Adamski | |
| 8,073,239 B1 * | 12/2011 | Bahrami | G06T 7/001 382/141 |
| 2001/0012381 A1 * | 8/2001 | Sari-Sarraf | G06T 7/001 382/111 |
| 2001/0028732 A1 * | 10/2001 | Coulombe | G06T 7/0006 382/199 |
| 2001/0042359 A1 | 11/2001 | Franzaroli | |
| 2002/0108353 A1 | 8/2002 | Franzaroli | |
| 2004/0030514 A1 * | 2/2004 | Popp | G05B 19/41875 702/81 |
| 2004/0123570 A1 | 7/2004 | Franzaroli | |
| 2007/0058840 A1 * | 3/2007 | Singh | A61F 13/15772 382/141 |
| 2010/0082152 A1 * | 4/2010 | Mishra | G06Q 10/08 700/226 |
| 2010/0276344 A1 | 11/2010 | Yamada | |
| 2010/0292828 A1 | 11/2010 | Einarsson | |
| 2012/0120229 A1 | 5/2012 | Brantley et al. | |
| 2014/0091013 A1 | 4/2014 | Streufert | |
| 2014/0146169 A1 | 5/2014 | Ollivier et al. | |
| 2014/0226892 A1 | 8/2014 | Kral et al. | |
| 2014/0247347 A1 * | 9/2014 | McNeill | G06V 10/764 382/103 |
| 2014/0290180 A1 | 10/2014 | Olbrich et al. | |
| 2014/0300734 A1 * | 10/2014 | Binetruy | H04N 7/18 348/135 |
| 2015/0001137 A1 | 1/2015 | Layne | |
| 2015/0212010 A1 * | 7/2015 | Lin | H04N 7/188 348/92 |
| 2015/0241341 A1 | 8/2015 | Ikeda | |
| 2015/0241360 A1 | 8/2015 | Niemela et al. | |
| 2015/0264319 A1 | 9/2015 | Wood et al. | |
| 2017/0191946 A1 * | 7/2017 | Smith | G07D 7/12 |
| 2018/0008104 A1 * | 1/2018 | Becker | B65H 26/06 |
| 2018/0099769 A1 | 4/2018 | McDonald | |

FOREIGN PATENT DOCUMENTS

| | | | | |
|---|---|---|---|---|
| GB | 1367105 A | | 9/1974 | |
| GB | 2102758 A | | 2/1983 | |
| JP | 2009186193 A | * | 8/2009 | |
| JP | 2009186193 A | | 8/2009 | |
| WO | 2007144920 A1 | | 12/2007 | |
| WO | 2008117150 A2 | | 10/2008 | |
| WO | WO-2008117150 A2 | * | 10/2008 | ........... B65B 25/146 |
| WO | WO-2013054719 A1 | * | 4/2013 | ........ A61F 13/15731 |

OTHER PUBLICATIONS

Franzaroli, Massimo—U.S. Appl. No. 15/550,242, filed Aug. 10, 2017.
Franzaroli, Massimo—U.S. Appl. No. 15/550,920, filed Aug. 14, 2017.
Franzaroli, Massimo—U.S. Appl. No. 15/550,950, filed Aug. 14, 2017.
European Search Report dated Feb. 18, 2021 for related European Patent Application No. 20197174.4.
International Search Report and Written Opinion dated Jun. 10, 2016 for related PCT Application No. PCT/IB2016/051029.
International Search Report and Written Opinion dated Aug. 31, 2016 for related PCT Application No. PCT/IB2016/051035.
International Search Report and Written Opinion dated Aug. 31, 2016 for related PCT Application No. PCT/IB2016/051031.
European Office Action dated Aug. 15, 2018 for related European Patent Application No. 16719477.8.
European Office Action dated Aug. 15, 2018 for related European Patent Application No. 16718488.0.
European Office Action dated Jul. 30, 2019 for related European Patent Application No. 16719477.8.
European Search Report dated Jul. 26, 2019 for related European Patent Application No. 19167874.
European Search Report dated Oct. 20, 2021 from related European Patent Application No. 20207907.5.

* cited by examiner

55' 55' 55'

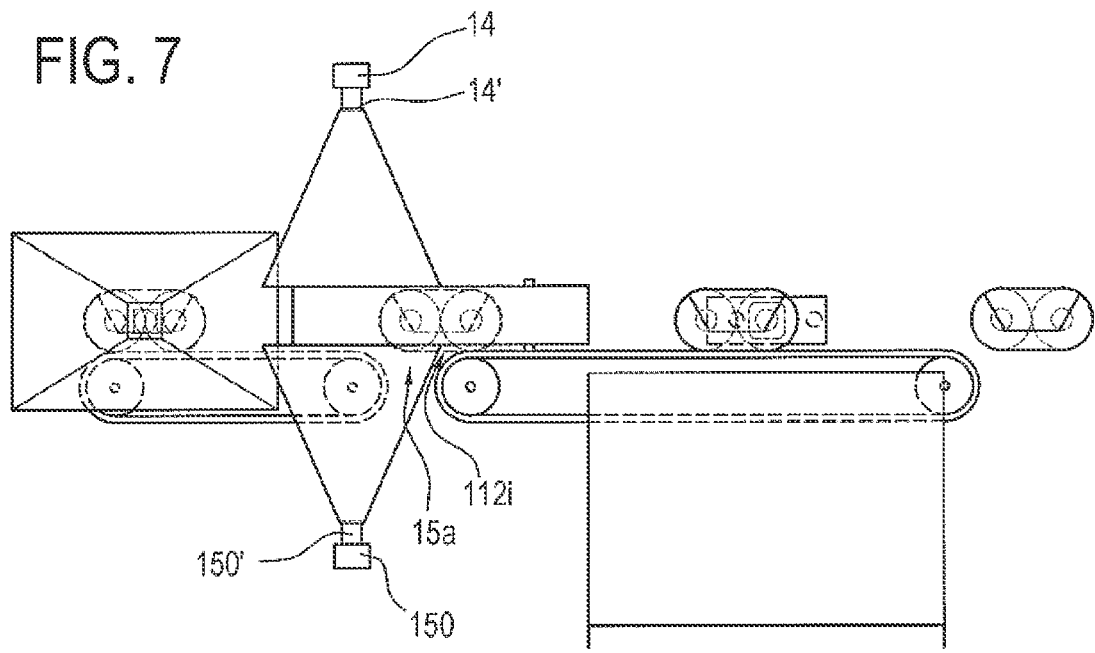
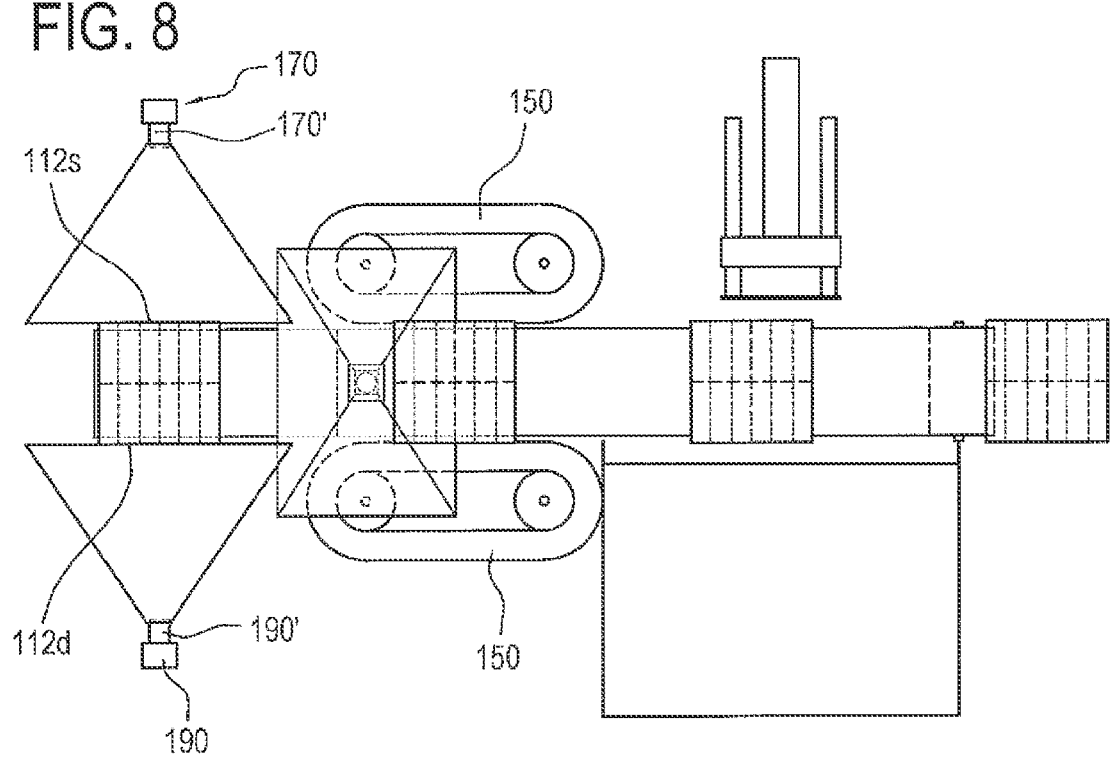

United States Patent

PLANT FOR PROCESSING PRODUCTS INCLUDING A UNIT FOR DETECTING DEFECTIVE PRODUCTS

This application is a divisional of U.S. patent application Ser. No. 15/550,242 filed Aug. 10, 2017, which is a National Phase of International Application PCT/162016/051029 filed Feb. 25, 2016 which designated the U.S. and that International Application was published under PCT Article 21(2) in English.

This application claims priority to Italian Application No. 6020150000016 filed Feb. 27, 2015, Italian Application No. 6020150000039 filed May 4, 2015 and Italian Application No. 202015000025907 filed Jun. 19, 2015. All applications are incorporated by reference herein.

TECHNICAL FIELD

This invention relates to a processing plant and, in particular, a plant for making respective products.

Preferably, the plant produces articles and/or packaging for respective articles, in particular in the form of articles of the tissue industry, especially articles made of paper material.

Preferably, the articles are in the form of rolls, tissue handkerchiefs, hand and face wipes, napkins or other, and the packaging is in the form of respective packets, packs, boxes, bags, pallets or other.

BACKGROUND ART

Known in the prior art in the tissue paper industry are plants for the production of articles and corresponding packaging, such as rolls and hand or face wipes of paper material, which are packed in corresponding packets, packs, bags, pallets or other.

Generally speaking, these prior art plants comprise at least one operating line including at least one upstream section for making the articles, in particular in the form of log saws for cutting rolls off respective elongate logs, and at least one respective packaging section, in particular for primary packaging, preferably in the form of a packing section where the articles or rolls are packed.

Prior art plants may also include one or more further packaging sections, in the form of a section for cartoning or bagging the packs and/or a section for palletizing the packs or cartons/bags.

Prior art plants also include conveying means by which the products are transported between one section of the plant and another, in particular between the means which make the articles and the respective packaging section and between one packaging section and another in the downstream part of the plant.

However, in plants of the above mentioned type in the tissue industry—but also in plants for making other types of products—, although the large quantities of articles made are of satisfactory quality, a certain number of defective end products are produced which are only occasionally removed, completely manually, by machine operators and which, unfortunately, are placed on the market and eventually reach end users.

Even today, therefore, prior art plants of this kind continue to produce defective products which do not measure up to consumer quality standards.

Moreover, in prior art plants of this kind, it is difficult to promptly determine the causes of defective products with any degree of certainty.

In short, prior art plants of this kind produce non-negligible quantities of defective products which machine operators find it difficult to pick out but which nevertheless lead to production losses for the companies which use these production plants.

Furthermore, there is also in the industry a generally felt need for machinery and equipment which are relatively low in cost and/or which do not have excessive impact on normal production activities.

Yet another need felt by the industry is that for machinery and equipment that is easy for operators to install and/or use.

DISCLOSURE OF THE INVENTION

This invention therefore proposes a new solution as an alternative to the solutions known up to now and, more specifically, proposes to overcome one or more of the above mentioned drawbacks and/or problems and/or to meet one or more of the needs felt in the trade or inferable from the above.

Accordingly, it is provided a processing plant, in particular for making respective articles or packages of respective articles; the articles being preferably in the form of articles of the tissue industry, such as rolls, handkerchiefs, hand and face wipes, napkins or other products made of paper material, and the packaging being preferably in the form of packets, packs, boxes, bags, pallets or other; preferably the plant comprises at least one operating line including at least one upstream section for making the articles, in particular in the form of a log saw for cutting rolls off respective elongate logs, at least one respective packaging section, in particular for primary packaging, preferably in the form of a packing section where the articles or rolls are packed and preferably at least one or more further packaging sections, in particular in the form of at least one bagging section where the packs are placed in bags and/or one palletizing section where the packs or bags are placed on pallets; the plant further comprising a conveying section, or means, by which the products are transported between one section of the plant and another, in particular between the means which make the articles and the respective packaging section and/or between one packaging section and another downstream; characterized in that it comprises at least one unit for detecting products, in particular defective products, especially articles and/or packages, and preferably in the form of a unit for detecting rolls and/or packs, in particular defective rolls and/or packs.

That way, it is possible to ascertain the actual number of defective products made in the corresponding plant and, in particular, in a plant of the tissue industry.

BRIEF DESCRIPTION OF THE DRAWINGS

This and other innovative aspects are set out in the appended claims and its technical features and advantages are apparent from the detailed description which follows of a preferred, advantageous embodiment which must, however, be considered purely as a non-limiting example of the invention; the description being made with reference to the accompanying drawings, in which:

FIG. 7 is a side view of the second preferred embodiment of the unit according to the invention;

FIG. 8 is a schematic top plan view of the second preferred embodiment of the unit according to this invention;

DETAILED DESCRIPTION OF PREFERRED EMBODIMENTS OF THE INVENTION

Figure 1:
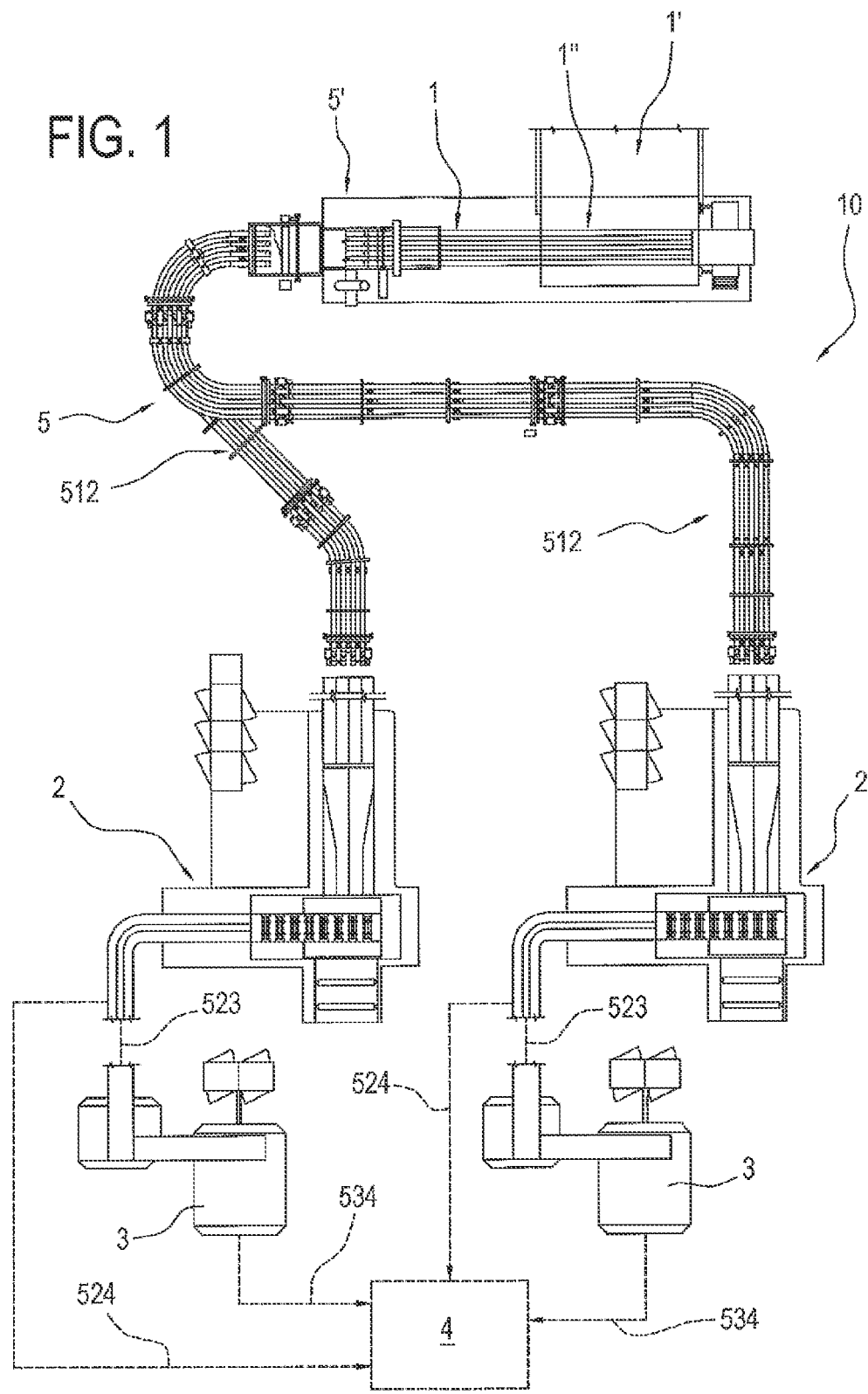
FIG. 1 shows a schematic plan view of a preferred embodiment of the plant of the tissue industry according to this invention, adapted to use a preferred embodiment of a unit for detecting products, in particular defective products.

FIG. 1 illustrates a preferred embodiment 10 of a processing plant, in particular for making respective products, where respective articles packed in respective packages are made.

Preferably, the articles are in the form of articles of the tissue industry, such as rolls, handkerchiefs, hand and face wipes, napkins or the like, made of paper material.

More specifically, the rolls are in the form of rolls of toilet paper and/or kitchen paper.

The packages are in turn preferably in the form of packets, packs, boxes, bags, pallets or other.

More specifically, the plant 10 comprises at least one operating line which includes at least one upstream section 1, for making the articles, in particular in the form of rolls, the upstream section being, in particular in the form of a log saw machine for cutting the rolls from a respective elongate log. As illustrated, the log saw machine comprises means 1' for making the log and means 1" for cutting the rolls from the log.

The plant 10 also comprises at least one packaging section 2, in particular for primary packaging, preferably in the form of a section for packing the articles or rolls, in particular in a respective film, preferably a plastic wrapping film.

More specifically, as illustrated, the example embodiment described herein comprises a first and a second primary packaging section 2, 2, fed by respective conveying sections, or lines, 5.

Downstream of the respective primary packaging section 2, the plant also comprises at least one or more further packaging sections 3 and/or 4.

More specifically, as illustrated, there are means or sections for bagging the packs, namely, a first and a second bagging section 3 downstream of the respective packing machines 2, and an end palletizing section 4 which receives the products through corresponding conveying lines from the respective bagging machine or directly from the respective packing machine 2.

As illustrated, the plant comprises a respective conveying section, or means, 5, by which the products are transported between one section of the plant and another, in particular between the means 1 which make the articles and the respective packaging section 2 and/or between one packaging section and another downstream.

More specifically, as illustrated, the conveying means 5 comprise means 512 for conveying the products between the section which makes the articles 1 and the respective packing section 2 and which comprise a respective stage, or apparatus, 5' for directing the flows of articles feeding out of the machine which makes the articles 1 towards corresponding lines leading to the respective packing machines 2, 2.

Also, as illustrated, the conveying means 5 comprise respective conveying means 523 running between the corresponding packing section 2 and the respective bagging section 3, as well as conveying means 534 running between the respective bagging section and the palletizing section 4.

As illustrated, the use of conveying means 524 running between the respective packing section 2 and the palletizing section 4 is also contemplated.

As illustrated, the conveying means comprise a plurality of parallel conveying lines or belts for corresponding pluralities of articles and/or packages. More specifically, as illustrated, four parallel conveyor belt lines are used in the stretches 512 of the conveying means.

Figure 2:
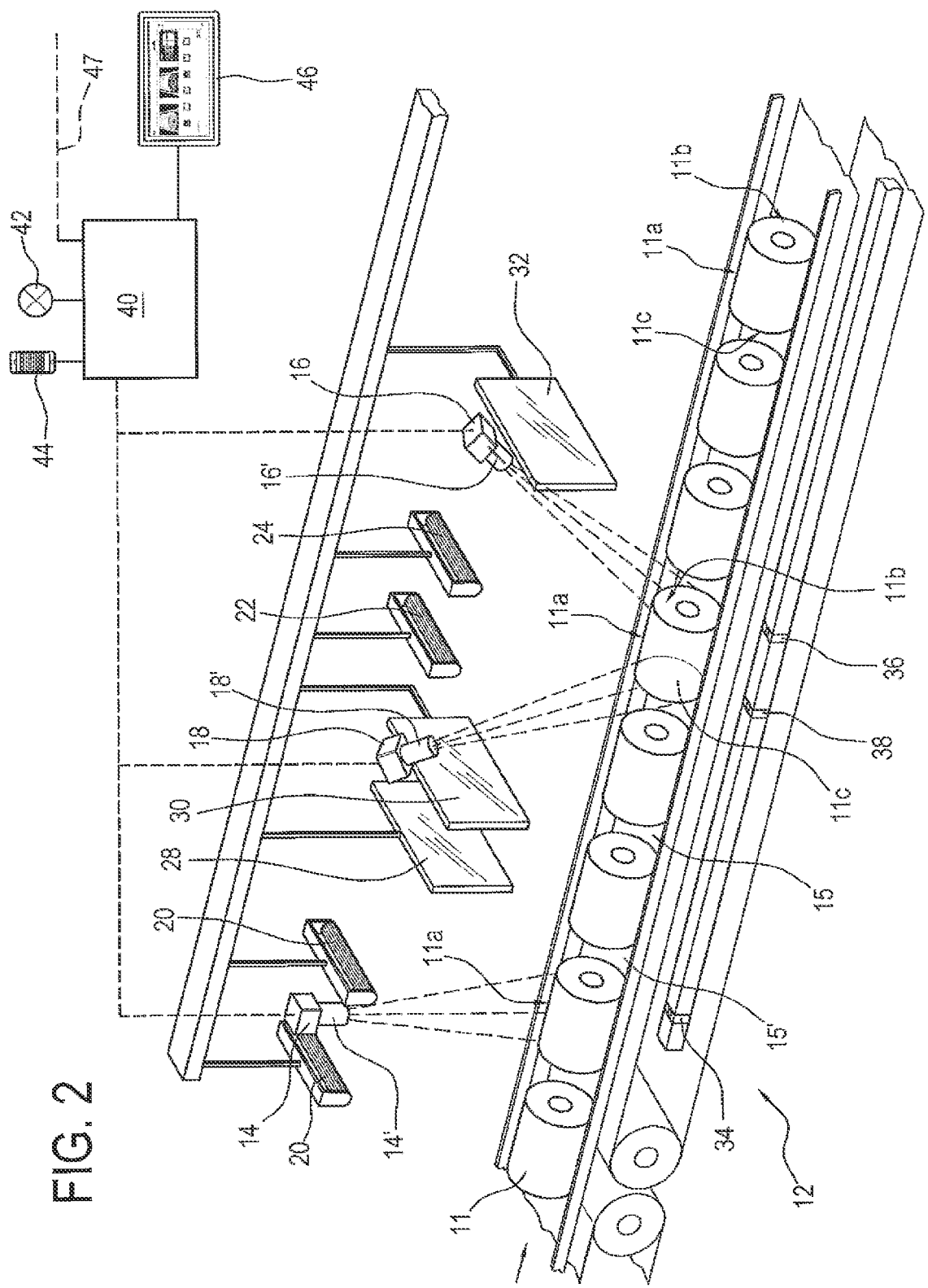
FIG. 2 shows a perspective view of a first preferred embodiment of a unit according to the invention for detecting products, in particular defective products, located along the respective product conveying line.

Advantageously, the plant comprises at least one unit 12, illustrated in FIG. 2, for detecting products, in particular defective products, especially articles and/or packages, and preferably in the form of a unit for detecting rolls and/or packs, in particular defective rolls and/or packs.

By way of example, the unit of the invention is adapted to work with rolls of different sizes, for example rolls whose diameter is preferably between 90 mm and 200 and whose length is preferably between 90 mm and 280 mm.

The unit of the invention is also adapted to work with rolls made of white or coloured paper or paper printed with respective logos, images, designs or decorations.

More specifically, the unit 12 for detecting products, in particular defective products, is advantageously situated at the conveying means of the plant, in particular at the conveying section 512 located between the section 1 which makes the articles, in particular the log saw which cuts off the rolls, and the respective packaging section 2, in particular defined by the corresponding packing machine.

Preferably, the unit of the invention is located at the outfeed of the log saw, or section for making the articles 1.

More specifically, the unit 12 for detecting products, in particular defective products, might also be located at the respective conveying section 523, 524, downstream of the respective packaging section 2, and/or at the respective conveying section 534, downstream of the respective bagging section 3.

Advantageously, the unit 12 for detecting products, in particular defective products, comprises means 14, 16, 18 for capturing at least one corresponding image, in particular a plurality of images, of the respective product.

More specifically, the unit 12 for detecting products, in particular defective products, thus advantageously comprises image capturing means embodied by camera means 14, 16, 18 adapted to capture one or more images of the respective product, even in the form of corresponding sequences of images.

More specifically, the camera means are in the form of one or more cameras known as "smart cameras", which comprise respective microprocessor means which allow controlling image capturing and which primarily process the captured images as a function of specific operating needs which will become clearer as this description continues.

Advantageously, therefore, the mode of detecting the product by the camera means 14, 16, 18 can be modified according to specific product image capturing requirements.

Advantageously, therefore, capturing means 14 are provided which are adapted to take snapshots of the product from above in order to obtain or capture at least one image of the top face or surface 11a of the respective product or roll.

It is thus possible to detect corresponding characteristics of the product.

More specifically, capturing images of the product from above allows inspecting the length, width and/or exterior aspect of the corresponding outside surface of the respective product, that is, also the condition or state of the respective end flap of the roll as will become clearer as this description continues.

Also advantageously provided are capturing means 16 which can take snapshots of the product from the front in order to capture at least one corresponding image of the front face 11b of the respective product or roll.

It is thus possible to detect corresponding characteristics of the product, in particular those which can be inferred from its front face.

Also advantageously provided are capturing means 18 which can take snapshots of the product from the back in order to capture at least one corresponding image of the rear face 11c of the respective product or roll.

It is thus possible to detect corresponding characteristics of the product, in particular those which can be inferred from its rear face.

More specifically, as illustrated in FIG. 2, the unit 12 advantageously comprises respective camera means which include a camera 14 located above the means 5 for conveying the product 11 to be detected.

More specifically, the camera 14 has a respective lens 14' which is directed, that is, whose optical axis is directed, perpendicularly or substantially perpendicularly, to the product supporting and transporting surface 15' of the corresponding conveying means 5.

That way, it is particularly easy to take snapshots of the top face of the product, in particular without interfering with the product conveyor, that is to say, without substantially disturbing normal plant operation.

Advantageously, as illustrated, the camera means comprise a corresponding camera and, in particular, a first and a second camera 16, 18, which are respectively located above the product conveying means and, in particular, whose respective lens, or the respective axis thereof, or the respective optical axis thereof, is inclined at a respective angle to the product supporting surface 15' of the conveying means 5.

That way, it is easy to take snapshots of the front and/or rear face of the product, in particular without interfering with the product conveyor, that is to say, without substantially disturbing normal plant operation.

More in detail, the camera means advantageously comprise a corresponding camera 16 whose respective lens 16' is inclined at a respective angle to the product supporting surface 15' of the conveying means 5, the lens 16' being directed in the direction opposite to the product feed direction.

That way, it is easy to take snapshots of the respective front face of the product without substantially disturbing normal plant operation.

Further, as illustrated, the camera means comprise a corresponding camera 18 whose respective lens 18' is inclined at a respective angle to the product supporting surface 15' of the conveying means 5, the lens 18' being directed in the same direction as the product feed direction.

That way, it is easy to take snapshots of the respective rear face of the product without substantially disturbing normal plant operation.

More specifically, as may be inferred from the drawings, the camera means comprise a corresponding camera 14, 16, 18, whose respective lens 14', 16', 18' is positioned at the transverse centre line of the product supporting surface 15' of the conveying means 5, and in particular, at the transverse centre line of the product 11 to be detected.

More specifically, the camera means 14, 16, 18 are advantageously positioned above the conveying means 5 at a distance from the product supporting surface 15' of the selfsame conveying means 5 such that they are higher up than the maximum height of the corresponding product to be detected as it moves along the conveying means 5, or such as to be higher up than the maximum height reachable by a plurality of product types or sizes which can be processed in the plant of the invention.

That means it is advantageously possible to avoid having to adjust the position of the camera means during changeovers.

More specifically, the camera means 14, 16, 18 advantageously have a respective depth of field, that is, a depth or length where the respective image is "in focus", that is to say, a clear image, and which is suitable for detecting a plurality of products of different sizes, in particular different heights and diameters, as they move forward along the conveying means 5. For example, the respective depth of field of the camera means 14, 16, 18 is suitable for taking snapshots of, or keeping in focus, rolls between 90 mm and 200 mm in diameter without carrying out any adjustments.

That way, it is not necessary to adjust the focus of the respective camera means when changing over to products of a different size.

Advantageously, the unit 12 for detecting products, in particular defective products, operates while the products 11 move along the respective conveying means 5, that is to say, while the products are moving forward or performing the respective feed movement.

In practice, the detection means—or camera means—14, 16, 18 operate while the products 11 advance on the respective conveying means 5, that is to say, they capture images of the products while the products are in motion.

More specifically, the unit 12 for detecting products, in particular defective products, operates with products moving forward at a speed of between 235 and 400 rolls per minute.

That way, any defective products can be detected without substantially disturbing normal plant operation and without causing production losses in the plant where the unit is installed.

More specifically, the perpendicular camera 14 is preferably a colour camera, whilst the inclined cameras 16 and 18 are preferably black and white cameras.

It will be understood, however, that the cameras and corresponding illuminators, which are described in more detail below, may be sensitive to electromagnetic radiation in one or more of the infrared, visible or ultraviolet fields.

Advantageously, also, the unit 12 for detecting products, in particular defective products, comprises respective means 20, 20, 22, 24 for lighting the product at the respective detection zone.

That way the product to be detected can be viewed specifically and optimally.

More specifically, the lighting means advantageously comprise a corresponding illuminator, in particular a first and a second illuminator, or lamp, 20, 20, at the respective camera 14 whose lens 14' is directed perpendicularly or substantially perpendicularly to the product supporting surface 15' of the conveying means 5.

That way, the top face of the product to be detected is viewed in optimum manner.

More specifically, the lighting means advantageously comprise a first and a second illuminator, or lamp, 20, 20, which are positioned along the longitudinal feed direction of the products upstream and downstream of the respective camera 14 whose lens 14' is directed perpendicularly or substantially perpendicularly to the product supporting surface 15' of the conveying means 5.

Advantageously, the lighting means comprise a corresponding illuminator or lamp, 22, 24, at the respective camera 16, 18 whose lens 16', 18' is inclined to the product supporting surface 15' of the conveying means 5.

That way, the respective transverse, front or rear face of the product to be detected is viewed in optimum manner.

More specifically, as illustrated, the lighting means comprise a corresponding illuminator or lamp, 22, 24, which is advantageously directed towards the respective camera 16, 18 whose lens 16', 18' is inclined to the product supporting surface 15' of the conveying means 5.

Advantageously, as illustrated, the lighting means comprise a corresponding illuminator or lamp, 22, 24, which is positioned along the longitudinal feed direction of the products upstream and downstream of the respective camera at the respective camera 16, 18 whose lens 16', 18' is inclined to the product supporting surface 15' of the conveying means 5.

As illustrated, the lighting means advantageously comprise at least one corresponding illuminator, or lamp, in particular a first and a second illuminator 22, 24, the respective illuminator being positioned along the longitudinal feed direction of the products between the respective cameras 16 and 18 whose respective lenses 16', 18' are inclined to the product supporting surface 15' of the conveying means 5.

Advantageously, the lighting means comprise a corresponding illuminator or lamp, 22, 24, which is located at substantially the same height as the respective camera 16, 18 whose lens 16', 18' is inclined to the product supporting surface 15' of the conveying means 5.

Advantageously, the lighting means then comprise a corresponding elongate illuminator, or elongate lamp, 20, 20, 22, 24 which extends transversely to the longitudinal direction of product feed and positioned centrally relative to the centre line of the conveying means 5, or rather, of the product supporting surface 15' of the conveying means 5.

Particularly advantageously, the lighting means 20, 20, 22, 24 are controlled in such a way as to view or illuminate the product variably, in particular as a function of the specific image to be captured, preferably as a function of the detail of the product to be specifically detected and inspected.

That way, the product is viewed in the optimum manner, in particular allowing its specific, potentially faulty characteristic to be detected.

Also imaginable is the use of distinct illuminators to light different parts of the product to allow taking images or sequences of images of corresponding details of the product.

Advantageously, the unit 12 for detecting products, in particular defective products, comprises means 28, 30, 32 for reflecting the radiation used to light the product, in particular the radiation emitted by the illuminator means 20, 20, 22, 24.

That way, the product to be detected, or rather, the specific zone of the product to be detected, can be viewed in the optimum manner.

More specifically, the means for reflecting the radiation used to light the product advantageously comprise a respective reflecting screen 28 at the camera 14 whose lens 14' is directed perpendicularly or substantially perpendicularly to the product supporting surface 15' of the conveying means 5, the reflecting screen 28 being, in particular, located downstream of the camera 14 along the longitudinal direction of product feed.

As illustrated, the means for reflecting the radiation used to light the product advantageously also comprise a reflecting screen, in particular first and second reflecting screens 30, 32, located, respectively, at the cameras 16, 18 whose lenses 16', 18' are inclined to the product supporting surface 15' of the conveying means 5.

In particular, as illustrated, the respective screen 30 or 32 is located, respectively, upstream or downstream, of the respective camera 16 or 18 along the longitudinal direction of product feed.

More specifically, as illustrated, the respective reflecting screen 30 or 32 is provided on the longitudinal side of the respective camera 16 or 18 opposite the side where the corresponding lighting means 22, 24 are located, being situated, in particular, just behind the respective camera means 16, 18.

Advantageously, the unit 12 for detecting products, in particular defective products, comprises means 34, 36, 38 for activating product detection by corresponding camera means 14, 16, 18.

That way, product detection by the camera means can be activated conveniently and promptly.

Advantageously, the unit 12 for detecting products, in particular defective products, comprises means 34, 36, 38 for activating detection of the respective product by the means 14, 16, 18 for capturing at least one corresponding image of the respective product, in particular by the corresponding camera means 14, 16, 18.

That way, product detection is advantageously activated at exactly the right time and only when strictly necessary.

More specifically, the means for activating product detection comprise sensor means for detecting the presence of the product at the respective detection zone and being, in particular, in the form of photocell means 34, 36, 38.

More specifically, advantageously, the means 34, 36, 38 for activating product detection emit a corresponding signal for activating detection when the product reaches a defined detection zone or when the product leaves a defined detection zone, that is to say, when it covers or uncovers a respective photocell located at the respective detection zone.

More specifically, the means 34, 36, 38 for activating detection are located at the conveying means 5.

More specifically, means 34 are provided for activating detection by the camera 14 whose lens 14' is directed perpendicularly or substantially perpendicularly to the product supporting surface 15' of the conveying means 5 and which are situated at the camera 14 itself and emit a corresponding activation signal when a product reaches the activation means 34 themselves, in particular, when the product is substantially centred longitudinally relative to the camera means 14.

Also provided are means 36 for activating detection by the respective camera 16 whose lens 16' is inclined to the product supporting surface 15' of the conveying means 5, these activating means 36 being situated upstream of the camera 16 itself at the zone of detecting the corresponding transverse face of the product and emitting a corresponding signal for activating the camera 16 when the product reaches the activation means 36 themselves.

Also provided are means 38 for activating detection by the respective camera 18 whose lens 18' is inclined to the product supporting surface 15' of the conveying means 5, these activating means 38 being situated downstream of the camera 18 itself at the zone of detecting the corresponding transverse face of the product and emitting a corresponding signal for activating the camera 18 when the product uncovers, or moves away from, the activation means 38 themselves.

Advantageously, at the unit 12 for detecting products, in particular defective products, in particular at the means 14, 16, 18 for capturing at least one corresponding image of the respective product, the products are spaced apart along their longitudinal feed direction preferably by a spacing such as to allow capturing a corresponding transverse image, preferably complete, of the respective front and/or rear face of the product.

Advantageously, although not specifically illustrated in the accompanying drawings, the plant of the invention may comprise, upstream of the product detection unit 12, corresponding means for spacing the products being conveyed.

That way, it is possible to detect the product in optimum manner, and in particular to detect the front and rear transverse surfaces of the product.

More specifically, the longitudinal spacing between the products is a function of the dimensions or size of the respective product or roll.

For example, for rolls 110 mm in diameter, the spacing between two consecutive rolls may be between 75 mm and 85 mm.

Advantageously, the unit 12 for detecting products, in particular defective products, comprises electronic processing means 40, in particular in the form of an industrial PC provided with corresponding program means or software means.

More specifically, advantageously, the electronic processing means 40 receive data corresponding to at least one image of the respective product from the means for capturing at least one corresponding image of the product, in particular from the camera means 14, 16, 18.

The electronic processing means 40 then process the image and determine whether the product has any defect or defects.

Advantageously, the electronic processing means 40 process the image and determine at least one corresponding parameter representing a particular product characteristic to be assessed.

The electronic processing means 40 then determine whether the product is defective or acceptable by assessing whether the parameter representing a particular characteristic of the product falls outside or inside a defined tolerance range around a predetermined reference value.

The predetermined reference value is determined by processing at least one image of at least one corresponding product whose respective characteristic is optimal or, in any case, compliant with specifications.

Advantageously, the tolerance value around the respective reference value can be selected or set at will, in particular by the operator in charge, for example using an input keyboard forming part of the electronic processing means 40.

For different product characteristics, the electronic processing means 40 might also determine the level of product defectiveness or acceptability on a predetermined scale of values of the parameter representing a particular characteristic of the product.

The level on the predetermined reference scale is differentiated or classified based on a corresponding predetermined threshold value.

More specifically, the reference scale might have three different levels, respectively defining a product which is without defects, or substantially without defects, a product which is defective but acceptable and a product which is defective and unacceptable. There might also be a fourth reference level to indicate a severely defective product.

The electronic processing means 40 are also adapted to determine whether the product must be considered defective and non-conforming, or conformant and acceptable by combining together the parameters or scores obtained from the detection of different product defects.

In practice, the parameters or scores obtained from the detection of different product defects are suitably weighted and combined to give a total value or score.

In a preferred embodiment, the total defect score or value is conveniently compared with a predetermined reference value in order to determine whether the product is non-conforming and, for example, must be rejected, or is conformant and, for example, must not be rejected.

More specifically, the "weighting", that is, the value by which the parameter or score of the respective defect is weighted might be greater, i.e. higher, for defects considered particularly serious, such as, for example, dirt on the transverse surface resulting from cutting the roll, or smaller, i.e. lower, for defects considered less serious such as, for example, embossing which is not centred on the outside surface of the roll.

Figure 3:
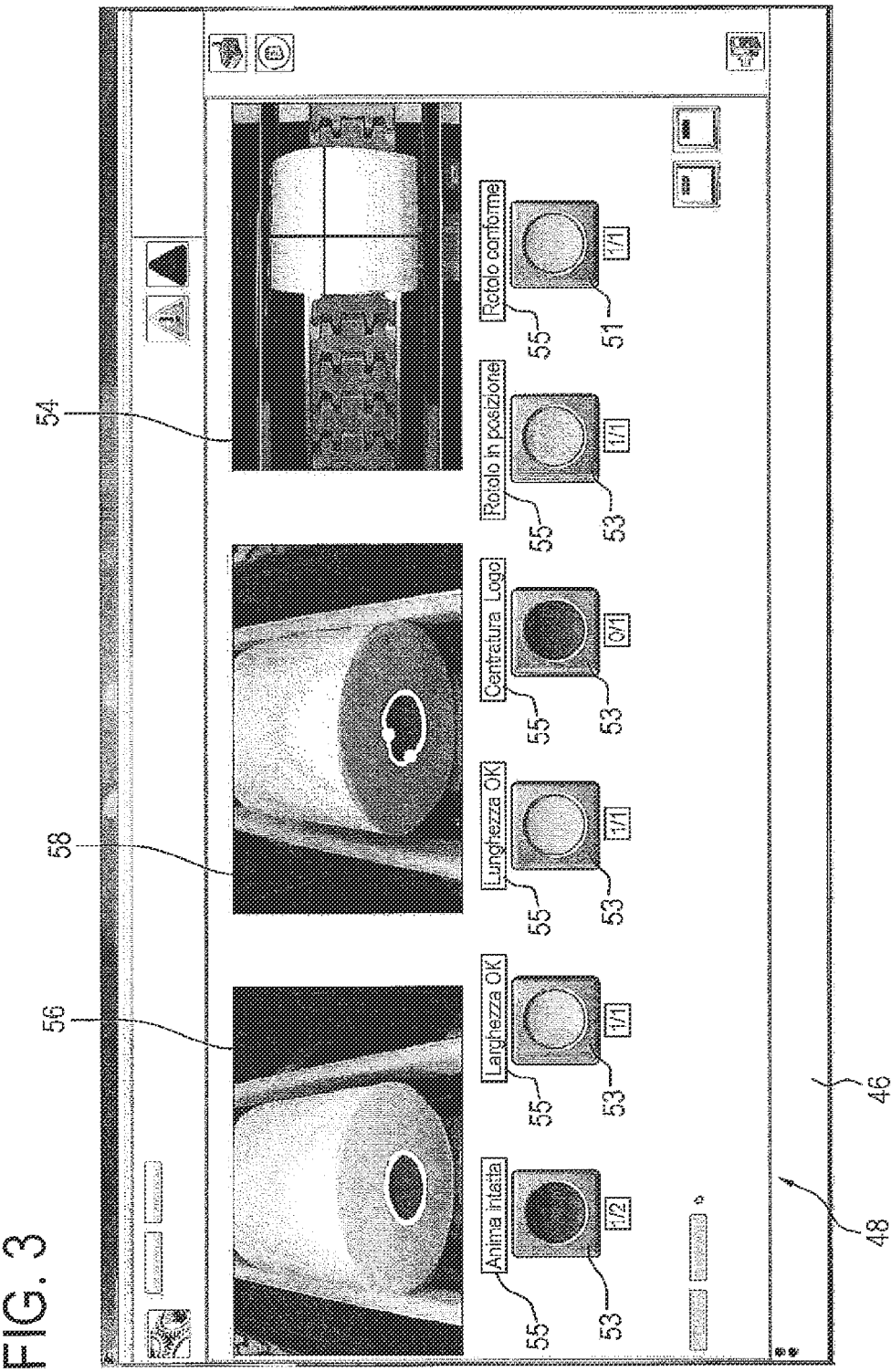
FIG. 3 shows a screenshot of the products being processed.

Advantageously, as may be inferred from FIGS. 2 and 3, the electronic processing means 40 trigger an operator alert procedure if they determine that the respective product is non-conforming.

More specifically, the alert procedure entails issuing a signal, preferably a light signal by means of an alarm lamp 42 at the detection unit 12, and/or a corresponding sound signal.

Advantageously, the electronic processing means 40 also send a corresponding message, in particular, an alarm or detected defect message, to the telephone, in particular, the mobile phone 44, or to another terminal device, in the operator's possession. More specifically, such a message might be sent to the operator only on reaching a predetermined, convenient defectiveness threshold or level, which might be selectively settable, if necessary.

The electronic processing means 40 also trigger a corresponding operator alert procedure through corresponding display means, in particular through the display means 46 of the unit 12 for detecting the products, in particular the defective products.

As may be inferred in particular from FIG. 3, the electronic processing means 40 advantageously cause to be displayed on the respective display means, in particular on the display means 46 of the unit 12 for detecting the products, in particular the defective products, a graphical interface or screen 48, which comprises at least one field 54, 56, 58 showing the respective product image captured by the image capturing means, and more specifically, by the camera means 14, 16,18.

In practice, advantageously, as shown in FIG. 3, the electronic processing means 40 display on the respective display means, in particular on the display means 46 of the unit 12 for detecting the products, in particular the defective products, a respective graphical interface or screen 48, which comprises a field 54 showing a respective image of the product or roll captured by the camera 14 whose lens 14' is directed perpendicularly or substantially perpendicularly.

Also, advantageously, as shown in FIG. 3, the electronic processing means 40 display on the respective display means, in particular on the display means 46 of the unit 12 for detecting the products, in particular the defective products, a respective graphical interface or screen 48, which comprises a field 56 showing a respective image of the product or roll captured by the camera 16 whose lens 16' is inclined and which captures an image of the front face of the product, and a field 58 showing a respective image of the product or roll captured by the camera 18 whose lens 18' is inclined and which captures an image of the rear face of the same product.

Further advantageously, the electronic processing means 40 display on the respective display means, in particular on the display means 46 of the unit 12 for detecting the products, in particular the defective products, a respective graphical interface or screen 48, which comprises an information field 51 which indicates whether the product is defective or conformant.

Further advantageously, the electronic processing means 40 display on the respective display means, in particular on the display means 46 of the unit 12 for detecting the products, in particular the defective products, a respective graphical interface or screen 48, which comprises one or more information fields 53 which indicate whether a specific characteristic of the product is defective or conformant.

As illustrated, the respective information field 51, 53 may advantageously be of the traffic light type, or of the varying colour type, from green to red, when the product or the specific characteristic thereof is conformant or non-conforming, i.e. defective.

Figure 4:
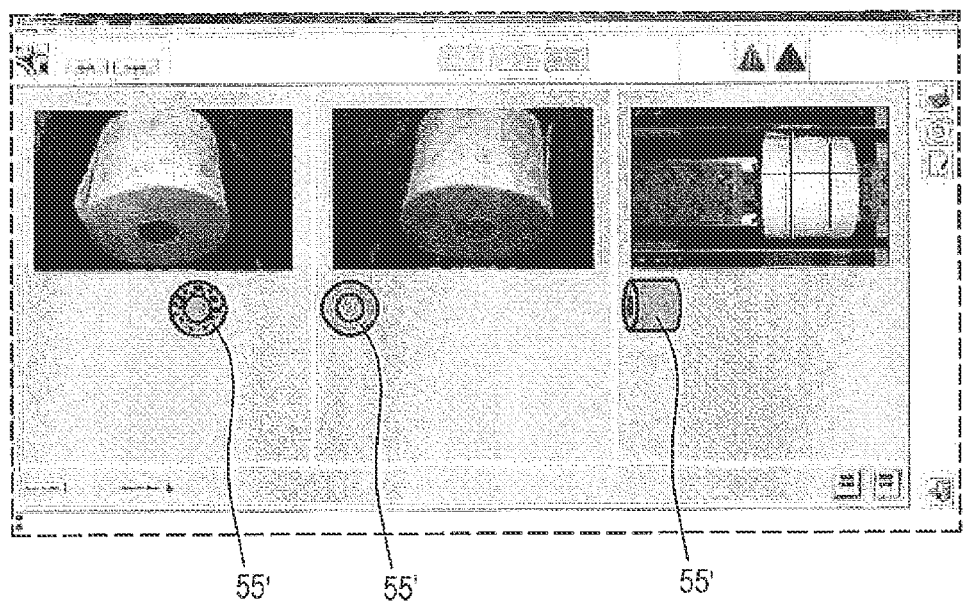
FIG. 4 shows a screenshot of the products being processed, alternative to the screenshot shown in FIG. 3.

Also, as illustrated, the electronic processing means 40 advantageously display at the respective information field 51, 53 a text 55, or possibly a drawing 55' (as shown in FIG. 4), which indicates or highlights the specific aspect or defect or product characteristic the respective information field 51, 53 refers to.

More in detail, the electronic processing means 40 advantageously determine the length and/or the width of the respective product or roll, determining it in particular through an image transmitted by the camera 14 whose lens 14' is directed perpendicularly or substantially perpendicularly, and thus determine whether the length and/or width is non-conforming, i.e. defective, or conformant, i.e. exact.

More specifically, the processing means 40 determine whether the length and/or the width of the respective product or roll falls within a certain tolerance interval, in particular a respective preset value for the specific size of product or roll detected. An example of a roll whose length is non-conforming, as detected by the present defect detection unit 12 and displayed on the respective display means 46, is shown in FIG. 5C.

Advantageously, the electronic processing means 40 determine the state of the outside surface of the product or roll, determining in particular the value of a corresponding parameter, and more specifically, determining it through an image transmitted by the camera 14 whose lens 14' is directed perpendicularly or substantially perpendicularly, and thus determine whether the outside surface is non-conforming, i.e. defective, or conformant. An example of a roll whose outside surface is non-conforming, as detected by the present defect detection unit 12 and displayed on the respective display means 46, is shown in FIG. 5F.

Advantageously, the electronic processing means 40 determine the position of the product or roll, determining in particular the value of a corresponding parameter, and more specifically, determining it through an image transmitted by the camera 14 whose lens 14' is directed perpendicularly or substantially perpendicularly, and thus determine whether the position is defective, i.e. incorrect, or conformant, i.e. correct. More specifically, a roll in an incorrect position might be a roll whose axis is rotated by 90° and whose respective transverse face is resting on the supporting surface 15' of the conveyor 5. An example of a roll whose position is non-conforming or incorrect, as detected by the present defect detection unit 12 and displayed on the respective display means 46, is shown in FIG. 5E.

Advantageously, the electronic processing means 40 determine whether the core of the product or roll is misshapen, determining in particular the value of a corresponding parameter, and more specifically, determining it through an image transmitted by the camera 16, 18 whose lens 16', 18' is inclined, and thus determine whether the core is non-conforming, i.e. defective, or conformant. More specifically, the level on a predetermined graduated scale the respective parameter falls into is determined, the predetermined graduated scale being specific to the respective size of product or roll detected. An example of a roll having a misshapen, non-conforming core, as detected by the present defect detection unit 12 and as displayed on the respective display means 46, is shown in FIG. 5B.

Advantageously, the electronic processing means 40 determine whether the respective transverse face of the product or roll is dirty, determining in particular the value of a corresponding parameter, and more specifically, determining it through an image transmitted by the camera 16, 18 whose lens 16', 18' is inclined, and thus determine whether the transverse face is defective, i.e. dirty, or conformant, i.e. clean or slightly dirty. More specifically, the level on a predetermined graduated scale the respective parameter falls into is determined. An example of a roll having a dirty, non-conforming transverse face, as detected by the present defect detection unit 12 and as displayed on the respective display means 46, is shown in FIG. 5G.

Advantageously, the electronic processing means 40 determine whether the logo or the printed text, design or decoration on the outside surface of the product or roll is correctly positioned or centred, determining in particular the value of a corresponding parameter, and more specifically, determining it through an image transmitted by the respective camera 16, 18 whose lens 16', 18' is inclined, and thus determine whether the centring is non-conforming, i.e. defective, or conformant. More specifically, the processing means determine whether the centring of the logo falls within a certain tolerance interval. An example of a roll where the logo on the outside surface of the product or roll is not correctly positioned or centred, as detected by the present defect detection unit 12 and as displayed on the respective display means 46, is shown in FIG. 5D.

Also, advantageously, the electronic processing means 40 determine whether the printing and embossing on the outside surface of the product are centred.

Advantageously, the electronic processing means 40 also determine whether the winding or rewinding of the product or roll is irregular.

Advantageously, the electronic processing means 40 also determine whether the core of the product or roll is missing.

Advantageously, the electronic processing means 40 also determine whether the end flap of the product or roll is detached or excessively long. An example of a roll having a non-conforming end flap, as detected by the present defect detection unit 12 and as displayed on the respective display means 46, is shown in FIG. 5H.

Figure 5A:
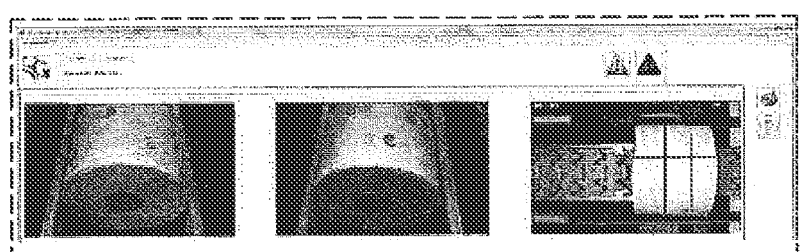
FIGS. 5A to 5H show different configurations of defective products as detected and displayed by the unit.
Figure 5B:
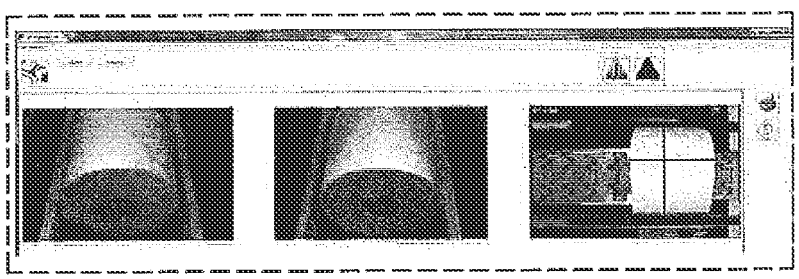
Figure 5C:
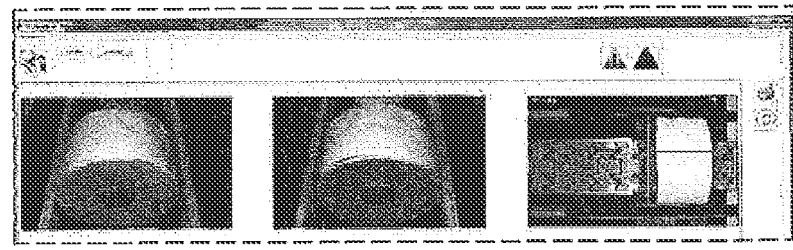
Figure 5D:
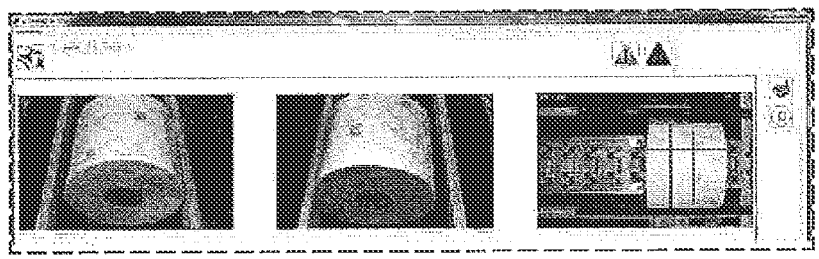
Figure 5E:
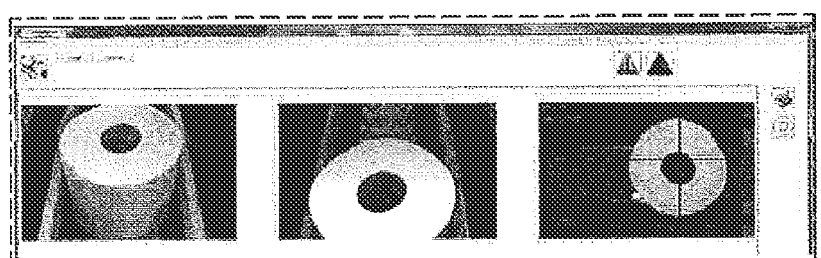
Figure 5F:
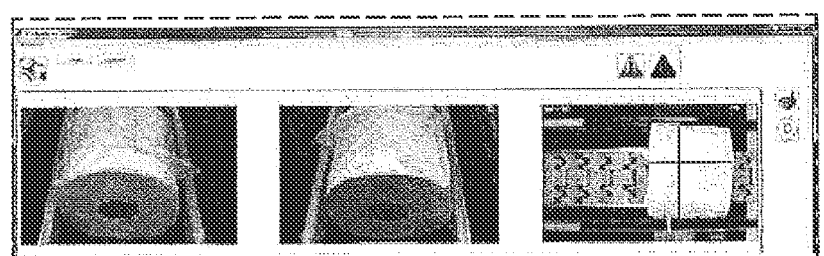
Figure 5G:
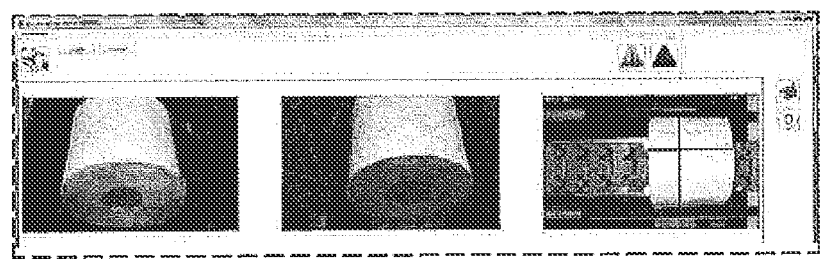
Figure 5H:
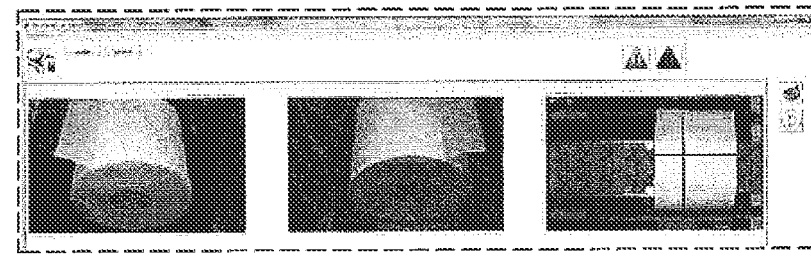

An example of a perfectly conformant roll, as detected by the present defect detection unit 12 and as displayed on the respective display means 46, is shown in particular in FIG. 5A.

Advantageously, the electronic processing means 40 also determine whether the transverse end face of the product or roll after being cut off is oblique.

Advantageously, the electronic processing means 40 provide defect tracking means used, in particular, for statistical purposes.

More specifically, the tracking means are advantageously adapted to count the number of rolls inspected and provide a total figure of production defectiveness, as well as the percentage of each single defect.

More specifically, the tracking means are, advantageously, adapted to indicate the type of rolls, the specific production session and the production batch. This data is conveniently stored with, or correlated to, the defects identified.

More specifically, the tracking means advantageously store the images of the defective products and associate them with the respective production data.

Advantageously, the images of non-defective products can also be taken and sampled, for example for purposes of statistical comparison with the defective products.

To do this, the defect tracking means might also be in the form of file folders, each containing image files of products having a respective defect, accompanied by images of non-defective products and/or a respective table or the like showing, for each defective product detected, the date, time and type of defect detected.

Advantageously, the predetermined reference or threshold values of the graduated scale differ according to the type and/or size of the product to be checked.

Advantageously, the predetermined reference or threshold values of the graduated scale are stored in a respective memory, in particular of the electronic processing means 40 of the unit 12 for detecting products, in particular defective products, and can preferably be called up manually by the operator or set automatically when the corresponding product type and/or size is processed.

Advantageously, also, the electronic processing means 40 are connected, at 47, to the plant control and/or management means.

Advantageously, the plant of the invention includes means for eliminating the defects detected and which might be in the form of means which directly correct, or simply indicate, the cause, upstream, which led to the production of a defective product.

More specifically, the means for eliminating the defects are in the form of means which, after the defects have been detected, send a corresponding signal to the control means of the device of the process machine, or operating section, situated upstream, so that the process in which the defect is produced can be corrected.

Further, the means for eliminating the defects might also be in the form of means for expelling the non-conforming products.

More specifically, the invention might contemplate the provision of a lateral expulsion unit, not illustrated in detail in the accompanying drawings and, for example electropneumatically driven, to expel non-conforming rolls, in conjunction with conveyor belt means and provided with respective control systems.

Figure 6:
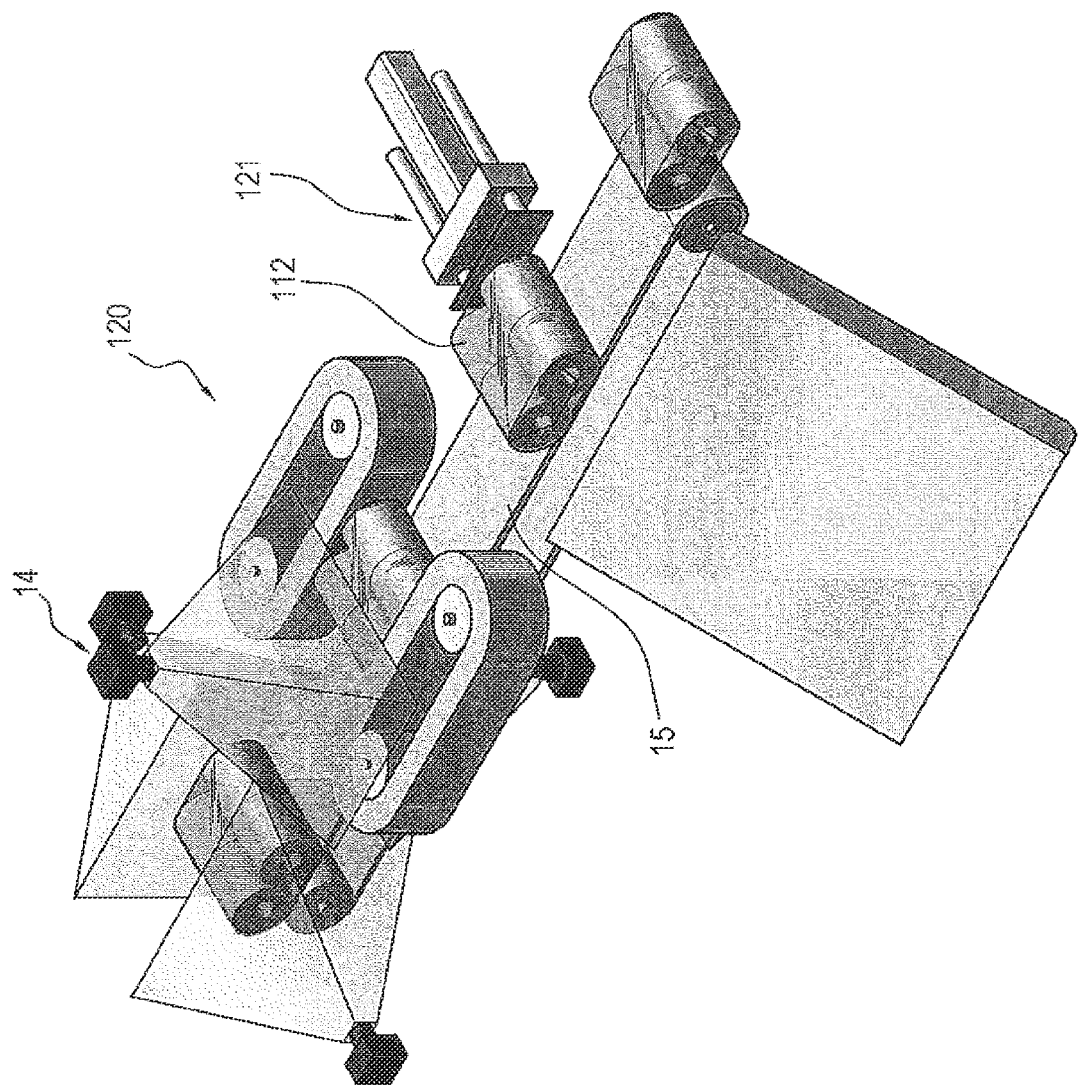
FIG. 6 is a schematic perspective view of a second preferred embodiment of the product detection unit.

FIGS. 6 to 8 illustrate a second preferred embodiment 120 of the unit for detecting the products, in particular defective products and which is particularly suitable for detecting corresponding packs of articles, in particular packs of rolls 112.

Figure 9:
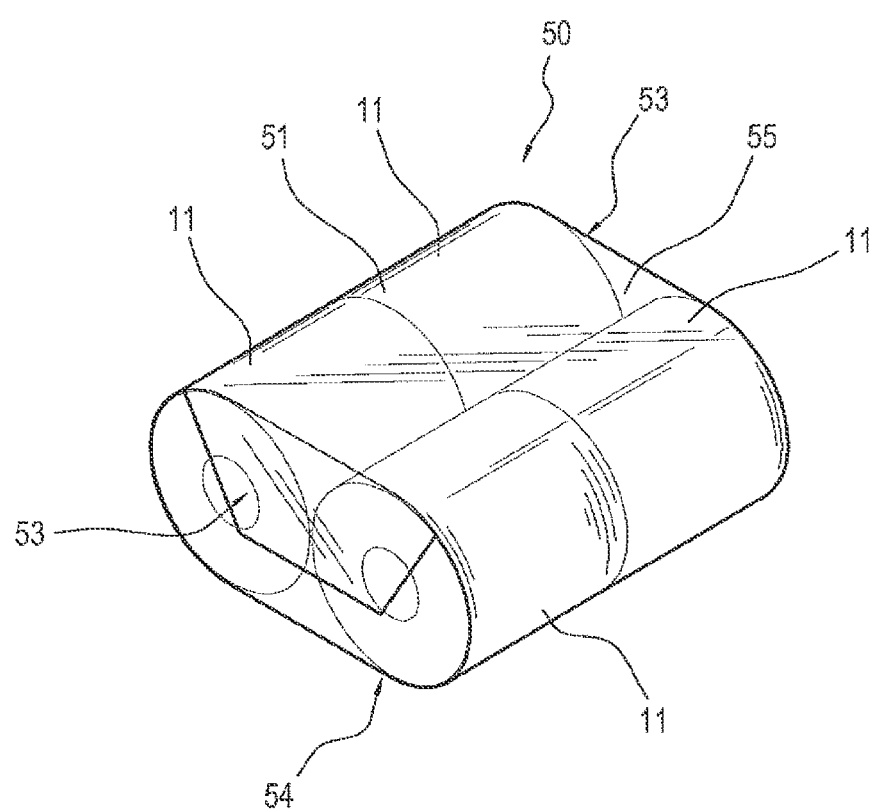
FIG. 9 shows a perspective view of a type of pack which can be processed by this plant.

FIG. 9 shows a preferred or typical embodiment 50 of a pack of rolls 11 which can be processed in the plant of the invention and illustrated, in particular, under normal conveying conditions.

As illustrated, the pack 50 comprises a plurality of rolls 11, suitably positioned and held together by a respective outer wrapper 51, preferably made of plastic material, sealed on its lateral faces 52, 53 and underside face 54. Only the seal on the face 53 is shown in FIG. 9. Further, the top face 55 of the pack is normally provided with a trademark or logo and/or other graphical elements. Further graphical elements, for example a barcode, may be provided on the underside face 54 of the product or pack.

The second preferred embodiment 120 comprises means 14 for detection from above which are similar in every way to those of the first preferred embodiment described above and which are not commented on again so as to avoid making this description too lengthy.

The second preferred embodiment 120 of the unit for detecting products, in particular defective products, advantageously comprises image capturing means 150 which are adapted to take snapshots of the product from below in order to capture at least one image of the underside face 112$i$ of the respective product.

It is thus possible to detect corresponding features present on the underside face of the product.

Further advantageously, the second preferred embodiment 120 of the unit for detecting products, in particular defective products, comprises image capturing means 170, 190 which are adapted to take snapshots of the product from a respective side in order to capture at least one image of the corresponding lateral face 112$s$, 112$d$ of the respective product.

More specifically, as illustrated, the image capturing means 170, 190 are adapted to take snapshots of the product from both sides in order to capture at least one image of the corresponding lateral face 112$s$, 112$d$ of the respective product.

It is thus possible to detect corresponding features present on the corresponding lateral face of the product.

The second 120 of the unit for detecting products, in particular defective products, uses a camera 14 positioned above, whose respective lens 14' is directed perpendicularly or totally perpendicularly to the product supporting surface 15' of the corresponding conveying means 5 and which is similar in every way to the one of the first preferred embodiment.

Advantageously, in the second preferred embodiment 120, the camera means comprise a corresponding camera positioned laterally of the product conveying means 15, in particular a first and a second camera 170, 190 positioned on opposite sides of the product conveying means 15 and, in particular, whose respective lens 170', 190' is directed parallel or substantially parallel to the product supporting surface 15' of the conveying means 5.

In practice, as illustrated, in the second preferred embodiment, the camera means advantageously comprise a corresponding camera positioned laterally of the product conveying means, in particular a first and a second camera 170, 190 positioned on opposite sides of the product conveying means 15 and, in particular, whose respective lens 170', 190' is directed at, or substantially at, the perpendicular centre line of the product to be detected.

Advantageously in the second preferred embodiment, the camera means comprise a corresponding camera 150 which is positioned under the product conveying means and, in particular whose respective lens 150' is directed perpendicularly or substantially perpendicularly to the product supporting surface 15' of the conveying means 5.

That way, it is easy to take snapshots of the underside face of the product, in particular without interfering with the product conveyor, that is to say, without substantially disturbing normal plant operation.

More specifically, the camera means advantageously comprise a camera 150 which is positioned under the product conveying means and, in particular, whose lens 150 is positioned at the transverse centre line of the conveying means 5, in particular at the transverse centre line of the product 11 to be detected.

It will be understood, however, that corresponding detection means, in particular of the camera type, similar to the ones denoted by the reference numeral 150 and which take snapshots of the product from below might also be used in the first preferred embodiment described previously.

More specifically, advantageously, the conveying means 5 comprise opening means 15*a* for detection of the product by the camera 190 positioned below.

More specifically, advantageously, the conveying means 5 comprise, at the opening means 15*a*, corresponding conveying means, or rotating belts 150, 150 which engage and feed the product forward as it passes by the opening means 15*a*. As illustrated, the product feed means 150, 150 simultaneously engage the respective product 112 from opposite sides.

More specifically, as illustrated, the top and bottom detection means are situated in a zone of the conveying means which is separate from the zone in which the means for detecting the lateral faces of the product are situated, the means 170, 190, for detecting the lateral faces being, as illustrated, preferably situated in a zone upstream of the zone where both of the cameras 14, 150 with the perpendicularly directed lenses are situated.

According to the second preferred embodiment of the unit for detecting products, in particular defective products, the corresponding electronic processing means advantageously determine, or are adapted to determine, whether the printing on the wrapper of the product or pack is not centred or well positioned.

In the second, preferred embodiment, the respective electronic processing means also advantageously determine, or are adapted to determine, whether the product or pack, or rather, the related wrapper, is incorrectly sealed.

In the second, preferred embodiment, the respective electronic processing means also advantageously determine, or are adapted to determine, whether the product or pack, or rather, the related wrapper, contains an article that is incorrectly positioned or rotated.

In the second, preferred embodiment, the respective electronic processing means also advantageously determine, or are adapted to determine, whether there is paper trapped in the seal of the product or pack, or rather, of the related wrapper.

In the second, preferred embodiment, the respective electronic processing means also advantageously determine, or are adapted to determine, whether there is a break in the wrapping film (for example, a hole caused by excessive heat during sealing or by tearing).

The unit of the second preferred embodiment in turn comprises respective lighting means, suitably controlled and connected to respective detection or camera means, not illustrated in detail in the accompanying drawings and which may be similar in every way to those described previously in connection with the first preferred embodiment.

Advantageously, the plant of the invention includes means for eliminating the defects detected, in particular in the form of means which remove the defective product, such as the ones denoted by the reference numeral 121 in FIG. 3, which eliminate the defective packs from the conveying line, in particular by means of corresponding means for engaging and pushing the product 112 off the conveying line 5.

Although not illustrated in detail in the accompanying drawings, the defect detection unit 12, 120 is, with the exception of the processing and defective product display means, housed in an enclosure, preferably of an openable type, which hides the detection zone from the external environment and which is open at its opposite ends, or which comprises open transverse end walls, to allow the product to exit the detection unit 12 itself.

Moreover, the cameras of the invention may be equipped with filters to highlight the wavelengths most suitable for the detection to be carried out, in particular as a function of the wavelength of the light sources or emitters used.

The invention described above is susceptible of industrial application. It would be obvious to one skilled in the art that several changes and modifications can be made to the invention without departing from the spirit and scope of the invention, described in depth above. It is also easy to imagine further embodiments of the invention comprising one or more of the features described herein. Moreover, it will be understood that all the details of the invention may be substituted for technically equivalent elements.

The invention claimed is:

1. A processing plant for making paper products, comprising:
   wherein the paper products are rolls of paper;
   a conveying section including a conveyor with a product supporting surface by which the paper products are transported between one section and another section;
   an electronic process control for controlling functioning of the plant sections;
   a unit for detecting the paper products;
   wherein the unit for detecting the paper products comprises a camera system for capturing one or more images of a respective paper product;
   wherein the camera system comprises a first camera positioned above the conveyor and having a first lens inclined at a first orientation to the product supporting surface of the conveyor;
   the electronic process control configured to determine whether a core of each of the rolls of paper is misshapen by determining a value of a corresponding parameter via an image obtained through the inclined lens and transmitted to the electronic process control lens, and determining whether the value of the corresponding parameter falls outside or inside a defined tolerance range around a predetermined reference value, to respectively determine whether the core is defective or conformant.

2. The plant according to claim 1, wherein the unit for detecting paper products is situated at the conveying section between an upstream section of an operating line and a packaging section or downstream of the packaging section.

3. The plant according to claim 1, wherein the camera system is adapted to take at least one snapshot of the respective paper product from above to capture at least one image of a top face of the respective paper product.

4. The plant according to claim 1, wherein the camera system is adapted to take at least one snapshot of the respective paper product from a front to capture at least one image of a front face of the respective paper product.

5. The plant according to claim 1, wherein the camera system is adapted to take at least one snapshot of the respective paper product from a back to capture at least one image of a rear face of the respective paper product.

6. The plant according to claim 1, wherein the camera system further comprises a second camera positioned above the conveyor and having a second lens inclined at a second orientation to the product supporting surface, the second orientation being different from the first orientation.

7. The plant according to claim 6, wherein at least one chosen from the first orientation and the second orientation is in a direction opposite to a product feed direction.

8. The plant according to claim 6, wherein at least one chosen from the first orientation and the second orientation is in a same direction as a product feed direction.

9. The plant according to claim 1, wherein the camera system has a depth of field such as to keep in focus a plurality of the paper products of different sizes.

10. The plant according to claim 1, wherein the unit for detecting the paper products operates the camera system to capture the one or more images while the paper products are moved in a feed direction by the conveyor.

11. The plant according to claim 1, wherein the unit for detecting the paper products comprises a light configured for lighting the paper products while capturing the one or more images.

12. The plant according to claim 1, wherein the electronic process control is configured as an industrial PC including corresponding programming or software.

13. The plant according to claim 12, wherein the electronic process control is configured to receive the one or more images from the camera system, process the one or more images and determine whether the respective paper product has one or more corresponding defects.

14. The plant according to claim 13, wherein, the electronic process control is configured to process the one or more images and determine a parameter representing a particular product characteristic to be assessed.

15. The plant according to claim 14, wherein the electronic process control is configured to determine whether the respective paper product is defective or acceptable by determining whether a value of the parameter falls outside or inside a defined tolerance range around a predetermined reference value.

16. The plant according to claim 15, wherein the defined tolerance range is selected or set at will by an operator in charge.

17. The plant according to claim 12, and further comprising a display, wherein the electronic process control displays on the display, a respective graphical interface or screen, which comprises an information field which indicates whether the respective paper product is defective or conformant.

18. The plant according to claim 6, wherein the first orientation is arranged to capture the one or more images of a front face of the respective paper product and the second orientation is arranged to capture the one or more images of a rear face of the respective paper product.

19. The plant according to claim 1, wherein the first orientation is arranged to capture the one or more images of a front face of the respective paper product.

20. The plant according to claim 1, wherein the first orientation is arranged to capture the one or more images of a rear face of the respective paper product.

21. The plant according to claim 1, wherein the electronic process control is configured to determine:
   at least one chosen from a length and a width of a respective article based on an image transmitted by the first camera, and
   whether the at least one chosen from the length and the width of the respective article is non-conforming.

* * * * *